United States Patent
Scott et al.

(10) Patent No.: US 7,549,694 B2
(45) Date of Patent: Jun. 23, 2009

(54) FILLER NECK HOUSING ASSEMBLY

(75) Inventors: Jason Scott, Redford, MI (US); Michael Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 11/555,446

(22) Filed: Nov. 1, 2006

(65) Prior Publication Data

US 2008/0136210 A1    Jun. 12, 2008

(51) Int. Cl.
*B60K 15/05* (2006.01)
(52) U.S. Cl. .................................. 296/97.22
(58) Field of Classification Search .............. 296/97.22; 220/86.2, 905, DIG. 33
See application file for complete search history.

(56) References Cited

U.S. PATENT DOCUMENTS

| | | | |
|---|---|---|---|
| 3,750,825 A | 8/1973 | Bachle | |
| 4,527,825 A * | 7/1985 | Clouse | 296/97.22 |
| 4,971,382 A | 11/1990 | Ohno | |
| 5,234,122 A * | 8/1993 | Cherng | 220/211 |
| 5,906,406 A | 5/1999 | Pajakowski | |
| 6,033,006 A * | 3/2000 | Bovellan et al. | 296/97.22 |
| 6,189,959 B1 * | 2/2001 | VanAssche et al. | 296/207 |
| 7,311,348 B1 * | 12/2007 | Bang | 296/97.22 |
| 2003/0098304 A1 * | 5/2003 | Foltz | 220/86.2 |
| 2005/0155671 A1 | 7/2005 | McClung et al. | |
| 2007/0040409 A1 * | 2/2007 | Alfaro | 296/97.22 |
| 2007/0046062 A1 * | 3/2007 | Yoshimura | 296/97.22 |

FOREIGN PATENT DOCUMENTS

| | | |
|---|---|---|
| CA | 2414208 A1 | 6/2004 |
| JP | 8011553 | 1/1996 |
| JP | 11254979 | 9/1999 |
| WO | 2005/009771 A1 | 2/2005 |

* cited by examiner

*Primary Examiner*—H Gutman
(74) *Attorney, Agent, or Firm*—Frederick Owens; Brooks Kushman P.C.

(57) ABSTRACT

A filler neck housing assembly is disclosed that includes a reinforcement bracket having a ring-shaped portion and a reinforcement flange. The reinforcement bracket is assembled to a housing panel that defines a recessed area inside a body outer panel. The reinforcement bracket includes door stop flanges and hinge attachment flanges to which a fuel door is attached by a hinge and hinge bracket.

8 Claims, 3 Drawing Sheets

FILLER NECK HOUSING ASSEMBLY

BACKGROUND OF THE INVENTION

1. Field of the Invention

The present invention relates to a fuel filler neck housing that includes a bracket for reinforcing the fuel door and hinge connection to the housing assembly.

2. Background Art

Gasoline and diesel fuel vehicles have a fuel tank that is filled through a filler neck. The filler neck is received in a housing that is attached to the inside of an opening in a body outer panel. The opening in the body outer panel is selectively closed by a fuel door that may be connected by a hinge to the housing assembly.

There are several problems that may be attendant to the structure and function of the fuel door and filler neck housing assembly. The fuel door must be sufficiently robust to accommodate over-extension forces without causing permanent deformation in the body outer panel. On many vehicles, the body outer panel is manufactured using 0.7-0.8 mm thick steel. Substantial thinning of the steel may cause the body outer panel to be subject to permanent deformation in the mounting surface if the body outer panel is designed to include a relatively deep draw area.

One potential solution to the deformation problem is to use heavier gauge sheet metal for the body outer panel or fuel filler neck housing, but this adds weight to the vehicle. Alternatively, a heavier gauge bracket may be attached to the fuel housing, but this also may add weight to the vehicle. Adding weight to a vehicle is generally considered to be undesirable from the standpoint of fuel economy.

Another problem associated with fuel doors and filler neck housing assemblies is that the component parts of the assembly are exposed to water and salt that may lead to corrosion of hinges and other parts of the assembly. Conventional, or piano-type, hinges are particularly subject to corrosion. Other parts in the fuel filler housing, such as a spring-loaded plunger mounted on the fuel housing to hold the door shut, may be subject to corrosion.

Fuel door assemblies include class A surfaces that must meet stringent fit and finish requirements. Some fuel door mounting structures may pose an ergonomic challenge if the fasteners used to secure the door and hinge assembly to the filler neck housing assembly are difficult to access. Some fuel door mounting structures include weld nuts that are located on the back of the filler neck housing assembly that may be difficult to align with fasteners to secure the door and hinge to the bracket.

These and other problems are addressed by this invention as summarized below.

SUMMARY OF THE INVENTION

According to one aspect of the present invention, a filler neck housing assembly is provided for a vehicle having a gas tank filler neck defining a fuel fill opening through which fuel is provided to a fuel tank. The assembly comprises a housing having an open end that is assembled to an opening in a body outer panel of the vehicle. The filler neck is received through a wall of the housing. The wall of the housing is recessed relative to the open end of the housing. A support bracket including a ring-shaped portion is assembled to the housing adjacent to the open end of the housing. The fuel fill opening is accessed through the ring-shaped portion of the support bracket. A hinge is attached to the support bracket and a door is movable on the hinge between an open position in which the opening in the body outer panel is uncovered and a closed position in which the opening in the body outer panel is covered.

According to other aspects of the invention, the support bracket may have a reinforcement flange that extends radially outwardly from the ring. The hinge is secured to the reinforcement flange. The hinge may be a goose-neck hinge that includes an over-center spring that biases the door towards the open position when the door is opened and that biases the door towards the closed position when the door is closed. The support bracket reinforces the open end of the housing on all sides of the housing. A force applied to the door when the door is opened is transferred to the attachment flange, the ring, and the housing.

According to another aspect of the invention, a filler neck housing assembly is provided for a vehicle that has a fuel cover door attached to a hinge for covering an opening in a body outer panel. The assembly comprises a housing panel that defines a recessed enclosure for a filler neck of a gas tank. The housing panel has an open side that is secured about the opening of the body outer panel. A reinforcement bracket is attached to the housing panel between the housing panel and the body outer panel. The reinforcement panel includes a ring-shaped portion that defines a fuel nozzle opening. The reinforcement panel also has a hinge reinforcement flange on one side of the ring-shaped portion to which the hinge is secured.

According to other aspects of the invention, the housing panel may have a flange that is secured to the body outer panel in a face-to-face relationship. The flange defines an indentation that receives the ring-shaped portion and the hinge reinforcement flange of the reinforcement panel. The assembly may further comprise a hinge attachment flange that extends radially inwardly from the ring-shaped portion of the reinforcement bracket and is adjacent to the hinge reinforcement flange. At least one door stop member may be attached to a door stop attachment flange. The door stop attachment flange extends radially inwardly from the ring-shaped portion of the reinforcement flange and is spaced from the hinge reinforcement flange.

According to another aspect of the invention, a method is provided for assembling a filler neck housing assembly to a vehicle. The method comprises assembling the filler neck to the wall of the housing. A support bracket having a ring-shaped portion and a reinforcement flange is attached to the housing adjacent to an open end of the housing. The ring-shaped portion extends around the filler neck and is axially spaced from the filler neck. The open end of the housing is attached to an opening in a body outer panel of the vehicle so that the filler neck is accessible through the open end of the housing. A hinge and door assembly are attached to the reinforcement flange of the support bracket.

According to other aspects of the method of the present invention, an over-center spring may be attached to the hinge and door assembly. At least one door stop flange extends radially inwardly from the ring of the bracket and is spaced from the reinforcement flange. The method may further comprise attaching a door stop to each door stop flange.

The method may further comprise attaching the support bracket to the housing by welding the support bracket to the housing. The open end of the housing may be welded to the opening in the body outer panel of the vehicle. According to the method, the step of attaching the hinge and door assembly to the attachment flange may be performed by securing the hinge and door assembly with removable fasteners after the open end of the housing is attached to the opening in the body outer panel.

According to other aspects of the method of the present invention, the support bracket may include a ring and an attachment flange wherein the method further comprises forming at least one door stop flange that extends radially inwardly from the ring and forming at least one door attachment flange that extends radially inwardly from the ring at a location that is spaced from the door stop flange. The step of forming the ring, attachment flange, door stop flange, and door attachment flange may be performed in a single series of stamping operations.

Other aspects of the invention will be apparent to those of ordinary skill in the art in view of the attached drawings and the following detailed description of the illustrated embodiment.

DETAILED DESCRIPTION OF THE PREFERRED EMBODIMENT(S)

Figure 1:
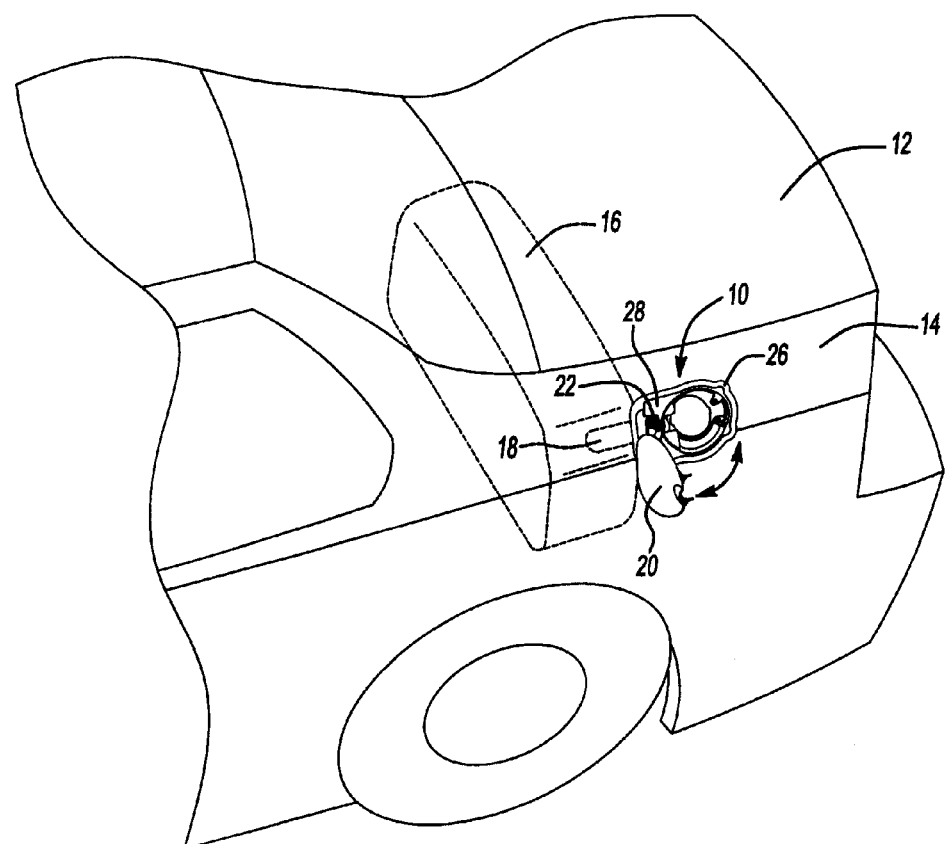
FIG. 1 is a diagrammatic view showing the arrangement of the fuel filler neck housing assembly relative to the body and gas tank of a vehicle.

Referring to FIG. 1, a filler neck housing assembly is generally indicated by reference numeral 10. The filler neck housing assembly 10 is part of a vehicle 12 and is secured to a body outer panel 14 of the vehicle 12. A fuel tank 16 is also part of the vehicle 12 and is refilled through a filler neck 18 that extends between the filler neck housing assembly 10 and the fuel tank 16. A fuel door 20 is secured to the vehicle 12 by a hinge 22 so that the fuel door 20 may be moved between open and closed positions.

The filler neck housing assembly 10 includes a housing panel 26 that defines a recessed area 30 in which the filler neck 18 is accessible. A reinforcement bracket 28, or support bracket, is assembled to the housing panel 26 to reinforce the housing panel 26 and also reinforces the body outer body panel 14.

Figure 2:
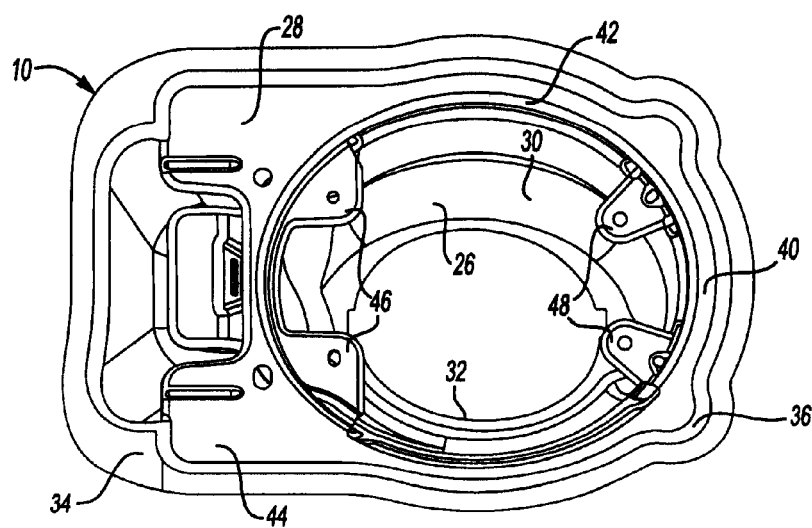
FIG. 2 is a side elevation view of the filler neck housing assembly.

Referring to FIG. 2, the filler neck housing assembly 10 is shown with the reinforcement bracket 28 assembled to the housing panel 26. The recessed area 30 is defined by the housing panel 26 and creates a pocket when assembled to the body outer panel 14 (shown in FIG. 1). The housing panel 26 has a filler neck receiving opening 32 in which the filler neck 18 (shown in FIG. 1) is received. The housing panel 26 also includes an attachment flange 34 that is welded to the body outer panel 14. An indentation 36 is formed in the housing panel 26 to receive the reinforcement bracket 28.

The reinforcement bracket 28 includes a ring-shaped portion 40 that defines a nozzle receiving opening 42. The ring-shaped portion 40 extends around the filler neck receiving opening 32 with the nozzle receiving opening 42 being axially spaced from the filler neck receiving opening 32. The reinforcement bracket 28 includes a reinforcement flange 44 on one side of the ring-shaped portion 40.

Hinge attachment flanges 46 extend radially inwardly relative to the nozzle receiving opening 42. Door stop flanges 48 are also provided on the ring-shaped portion 40 and extend radially inwardly from the nozzle receiving opening 42.

Figure 3:
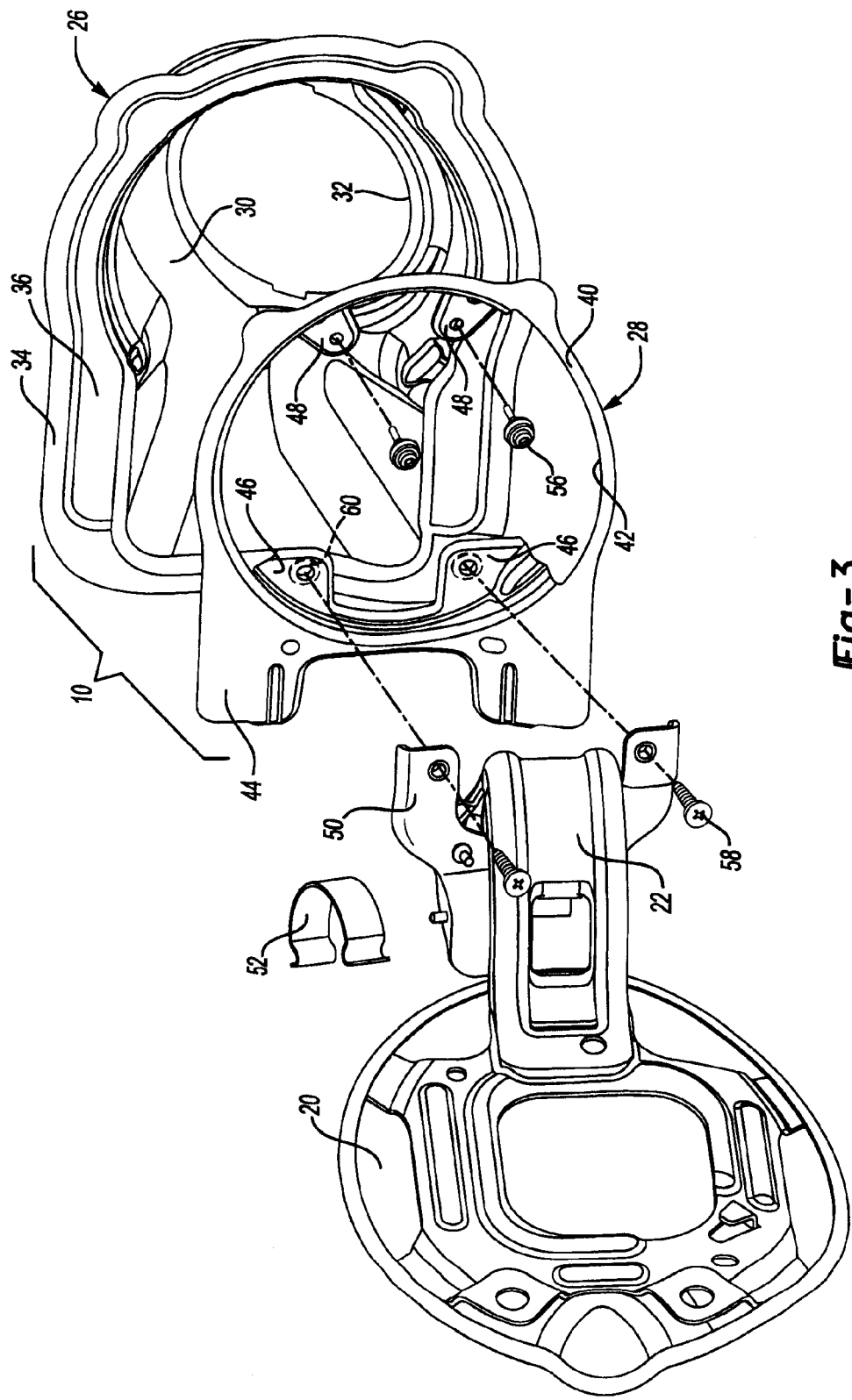
FIG. 3 is an exploded perspective view of the filler neck housing assembly and a fuel door that is connected to the housing assembly by a hinge.

Referring to FIG. 3, the filler neck housing assembly 10 is shown with the fuel door 20 and hinge 22 subassembly. The housing panel 26 and reinforcement bracket 28 are shown separated from each other. The housing panel 26 defines a recessed area 30 in which the filler neck receiving opening 32 is formed. The housing panel 26 also includes an attachment flange 34 that is abutted against the body outer panel 14. The indentation 36 is formed in the attachment flange 34 and receives the reinforcement bracket 28. The reinforcement bracket 28 has a ring-shaped portion 40 that defines a nozzle receiving opening 42. A reinforcement flange 44 extends in the forward vehicle direction from the ring-shaped portion 40.

Hinge attachment flanges 46 extend inwardly relative to the ring-shaped portion 40. The door stop flanges 48 also extend radially inwardly from the ring-shaped portion 40. Door stops 56 are shown in FIG. 3 that are assembled to the door stop flanges 48.

The fuel door 20 and hinge 22 are assembled to a hinge bracket 50 that is in turn assembled to the hinge attachment flanges 46. An over-center spring 52 is assembled to the hinge and hinge bracket 50. The over-center spring 52 biases the door 20 to its open position as the door is opened and, conversely, biases the fuel door 20 to its closed position as the fuel door is closed. The hinge bracket 50 is connected to the hinge attachment flanges 46 by bolts 58 and weld nuts 60 that secure the hinge bracket 50 to the hinge attachment flanges 46.

Figure 4:
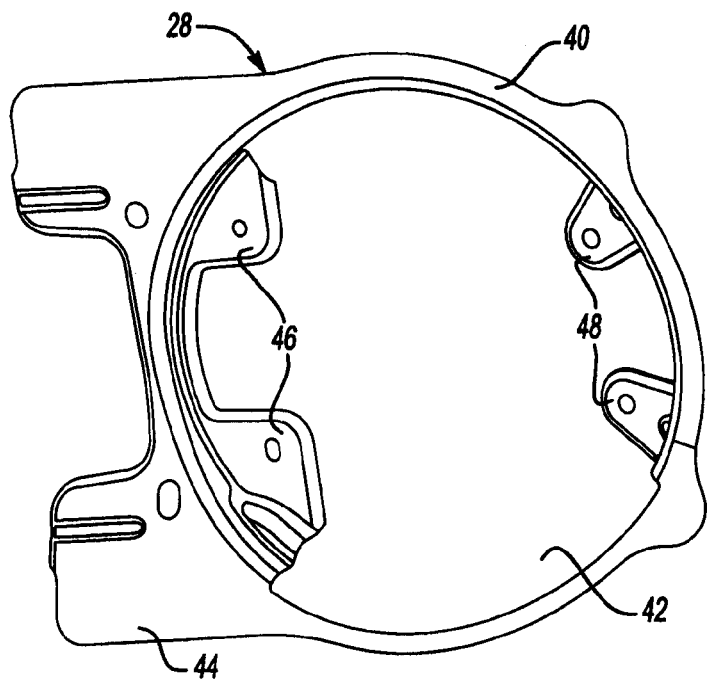
FIG. 4 is a side elevation view of a reinforcement bracket of the filler neck housing assembly.
Figure 5:
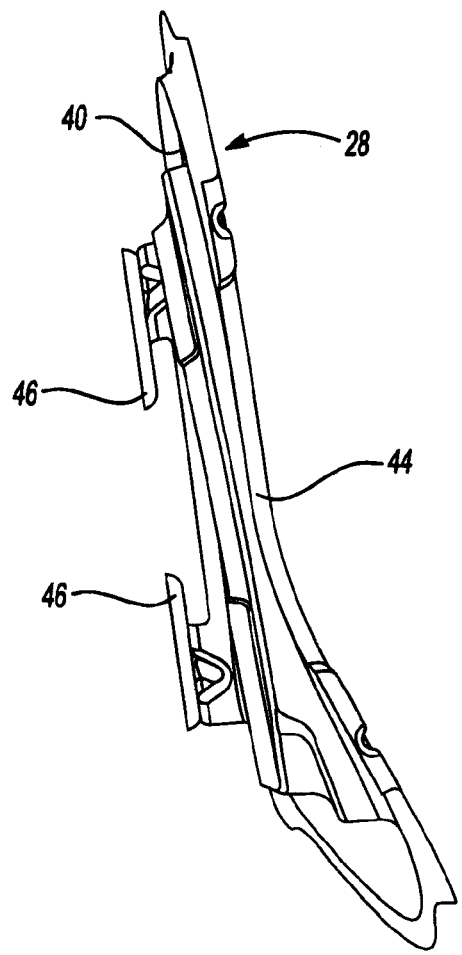
FIG. 5 is a front elevation view of the reinforcement bracket of the filler neck housing assembly.

Referring to FIGS. 4 and 5, the reinforcement bracket 28 is shown in isolation. The reinforcement bracket 28 has a ring-shaped portion 40 that extends around the nozzle receiving opening 42. The reinforcement flange 44 extends radially outwardly relative to the ring-shaped portion 40 on one side. The hinge attachment flanges 46 and door stop flanges 48 are also formed on the reinforcement bracket 28. The reinforcement bracket 28 which includes all of the elements shown in FIGS. 4 and 5 is formed in a sheet metal forming process wherein the reinforcement bracket 28 is drawn, trimmed and formed in a single set of sheet metal forming operations.

While the best mode for carrying out the invention has been described in detail, those familiar with the art to which this invention relates will recognize various alternative designs and embodiments for practicing the invention as defined by the following claims.

What is claimed:

1. A filler neck housing assembly for a vehicle having a gas tank filler neck defining a fuel fill opening through which fuel is provided to a fuel tank, a body outer panel defining an access opening, a hinge is connected to a fuel door that is movable on the hinge between an open position in which the access opening in the body outer panel is uncovered, and a closed position in which the access opening in the body outer panel is covered, the assembly comprising:

a housing having an attachment flange at an open end that is assembled about the access opening in the body outer panel of the vehicle, the housing receiving the filler neck through a wall of the housing that is recessed relative to the open end of the housing, the fuel fill opening being accessible in the housing; and a support bracket having a ring that is assembled to the attachment flange of the housing adjacent to the open end of the housing, the support bracket being disposed between the housing and the body outer panel wherein the fuel fill opening is accessed through the ring, and wherein the hinge is attached to the support bracket that reinforces the housing and body outer panel.

2. The filler neck housing assembly of claim 1 wherein the support bracket has a reinforcement flange that extends radially outwardly from the ring.

3. The filler neck housing assembly of claim 2 wherein the hinge is secured to the reinforcement flange.

4. The filler neck housing assembly of claim 1 wherein the hinge is a gooseneck hinge that includes an over-center spring that biases the door towards the open position when the door is opened and that biases the door towards the closed position when the door is closed.

5. The filler neck housing assembly of claim 1 wherein the support bracket reinforces the open end of the housing on all sides of the housing and wherein a force applied to the door when open is transferred to the attachment flange, the ring, and the housing.

6. A filler neck housing assembly for a vehicle having a filler neck through which fuel is supplied to a gas tank, the vehicle having a fuel cover door that is attached to a hinge for covering an opening in a body outer panel, the assembly comprising:

a housing panel that defines a recessed area in which the filler neck of the gas tank is accessible, the housing panel having an open side that is secured about the opening in the body outer panel;

a reinforcement bracket attached to the housing panel between the housing panel and the body outer panel, the reinforcement panel having a ring shaped portion that defines a fuel nozzle opening and having a hinge reinforcement flange on one side of the ring shaped portion to which the hinge is secured; wherein the housing panel has a flange that is secured to the body outer panel in a face-to-face relationship and wherein the flange defines an indentation, wherein the ring shared portion and the hinge reinforcement flange are received in the indentation.

7. The filler neck housing assembly of claim 6 further comprising a hinge attachment flange that extends radially inwardly from the ring shaped portion of the reinforcement bracket and is adjacent to the hinge reinforcement flange.

8. The filler neck housing assembly of claim 6 further comprising at least one door stop member that is attached to a door stop attachment flange that extends radially inwardly from the ring shaped portion of the reinforcement bracket and is spaced from the hinge reinforcement flange.

* * * * *